Dec. 11, 1934.　　　A. T. KROGH-LUND　　　1,984,219
PROCESS AND APPARATUS FOR REDUCING THE HARDNESS OF WATER
Filed May 8, 1930
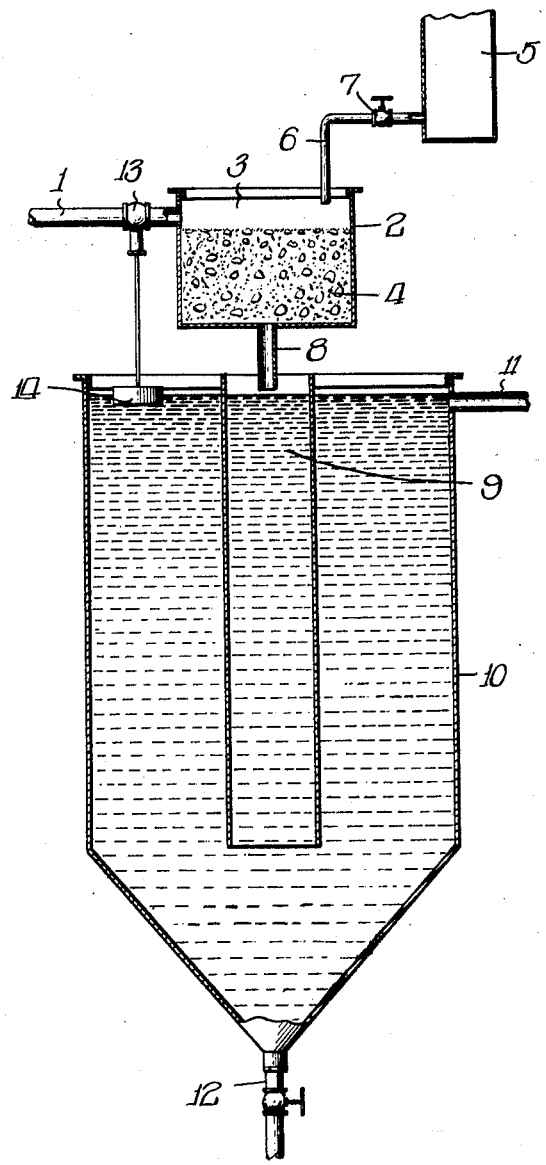
Inventor:
Aage Thorkil Krogh-Lund,
By Cromwell, Greist-Warden
attys.

Patented Dec. 11, 1934

1,984,219

UNITED STATES PATENT OFFICE 1,984,219

PROCESS AND APPARATUS FOR REDUCING THE HARDNESS OF WATER

Aage Thorkil Krogh-Lund, Copenhagen, Denmark, assignor to I. Kruger A/S, Copenhagen, Denmark Reproduced as corrected No Drawing. Application May 8, 1930, Serial No. 450,876. In Denmark May 23, 1929

5 Claims. (Cl. 210—16)

The methods in general use for softening water, completely or in part, by precipitation of the hardening ingredients in some form or another, most frequently as carbonates, suffer from the drawback that the precipitation requires a long time, particularly at low temperature. By the well known lime soda process, for instance, at least two hours are necessary to complete the precipitation. It follows that the receptacles in which the precipitation takes place must be relatively large, and the water to be softened must pass through them very slowly. If, as often happens, these conditions are not sufficiently provided for, then obnoxious after precipitations will appear. It has been proposed to accelerate the precipitation process by introducing into the water previously precipitated substances of similar kind to those the precipitation of which it is desired to promote. The particles of the previously precipitated substances then act as cores on which the new precipitation settles, until they reach a certain size when they lose their power to further assist precipitation. The use of such previously precipitated substances for the purpose indicated is exemplified in the patent to Green and Behrman, No. 1,653,272, issued December 20, 1927. The present invention, too, involves the use of substances which by contact with the water, to which precipitating reagents have been added, speed up the formation and settling of the precipitate. But according to this invention such substances are employed in a totally different way. We have found that a mere quick or even quite momentary contact with solids, insoluble or practically insoluble in the water and possessing the power to promote the formation and settling of the precipitate, suffices to influence the water in such a way that the formation of the deposit is accelerated even if it takes place at a time when the water is no longer in contact with the accelerating solids. It is clear that, in this case, the solid contact substances do not act as cores for the settling of the deposit. Marble being in certain cases a suitable contact substance, the present invention might be carried out by letting the water— after addition of precipitating reagents—flow as a thin sheet across a marble plate into a receptacle. No deposit would then settle on the marble plate, but the separation and precipitation in the receptacle would take place more rapidly, and the deposit formed would be easier to remove by filtration, than if the water had not been in contact with the marble plate. Generally speaking, the present invention is carried out by first bringing the water to be completely or partly softened—after addition of precipitating reagents—into contact with substances which promote the precipitation in a known manner, and then again remove the water from contact with those substances before the main part of the deposit has been formed. In practice, the invention is usually carried out by letting the water pass through a container charged with pieces of suitable size of a contact substance suited for the purpose in view. The contact substance may, as is the case in the known processes referred to above, consist of a solid, insoluble or practically insoluble in the water and chemically related to the substances to be precipitated. But it may preferably be in contradistinction to the known processes, in a state of aggregation differing from that of the precipitated substances. According to another embodiment of the invention the contact material consists in a carrying substance which is either provided with a thin surface layer or film of the substance acting as a contact substance or impregnated with such substances. The carrying substance may consist e. g. in ordinary chips, small stones, brick fragments or a pory (porous) material such as lava, slags and the like. The surface layer, film or impregnation may be produced by precipitating the contact substance on the surface or in the pores of the carrier. For the production of the precipitate an aqueous solution may be used, containing or supplied with the ions necessary for producing the insoluble contact material. Thus the very water to be softened may be used also for precipitating the film or for impregnating the carrying substances, when, after the addition of suitable precipitating agencies, such water has passed so slowly over a carrying substance of the above named kind that a suitable amount of precipitate is produced during the period of time in which the water is in contact with said materials. After producing a film of contact material or an impregnation the velocity of the water can be increased when the surface-covered or impregnated material will act as a contact body according to the present invention. Thus, by precipitation of a deposit consisting mainly of carbonate of lime, as is the case in most of the softening processes of this class in general use, the water—mixed with lime and perhaps soda—is passed through a bed of marble chips or pieces of limestone or other active substances. The pieces may, for instance, have the shape and size of cubes with a side length of about ¼", but it is clear that shapes and sizes may vary within very wide limits. The sizes are limited upwards by the consideration that very particle of the water must be able to get into contact with the substance during the passage through it, and downwards through the condition that the bed must not act as a filter. This latter condition may be fulfilled even with comparatively small pieces if the water is passed through in an upward direction. Our experience shows that if any considerable amount of deposit is allowed to settle in the contact substance the bed will become clogged and thus the passage of the water will be stopped. According to the present invention, therefore, the water is preferably passed so quickly through the contact substance that no or only very little deposit is formed before the water comes to rest in the settling vessel. The time required for complete settling of the precipitate is shortened very considerably by the use of a contact material according to the present invention, for instance to about one fourth of the time required when the contact material is not used, and furthermore the use of the invention has the effect of imparting to the precipitate a physical consistency which makes it much easier removable by filtration or decantation than it would otherwise be.

The invention may easily be carried out in connection with the ordinary softening plants in which the hardness of the water is removed by addition of lime and/or other chemicals, by shunting the container with the contact substance in between the measuring apparatus and the settling tank. The effect of this arrangement is that the size of the settling tank may be very considerably reduced or the capacity of a given plant may be highly increased.

In the accompanying drawing 1 represents the water inlet leading to the tank 2 which has in its upper part the mixing chamber 3, and in its lower part the bed of contact material 4. The tank 5 contains a supply of suitable treating chemical and may be provided with agitators, not shown, if desired. The pipe 6 leading from tank 5 to chamber 3 contains the regulating valve 7 which may be of any form suitable to regulate the flow of chemical to the water. Pipe 8 leads from tank 2 at a point beyond the contact bed 4 to the downtake 9 of the settling tank 10, which has the outlet 11 and the sludge discharge 12. If desired, the valve 13 may be provided in the inlet 1 and joined to the float 14 which rests on the water in 10 so as to control the inflow of water.

In operation the raw water enters through pipe 1 and in chamber 3 is mixed with the treating chemical supplied through pipe 6, the mixture then passing down through the contact bed 4 and through pipe 8 to downtake 9, through which it is conducted toward the bottom of settling tank 10. As the water rises in the settling tank the sludge falls to the bottom whence it may be periodically blown off through 12, while the clarified water emerges through 11.

While for purposes of illustration, I have shown an apparatus embodying my invention having the contact bed disposed in a certain way, yet it is understood that this, as well as the arrangements for supplying the treating chemicals and for mixing the raw water and chemicals, as well as the form of the settling tank and other details of construction or arrangement may be varied as desired according to the particular conditions to be met or for other reasons, my invention not being limited to any particular form of apparatus. Also the direction of flow through the contact bed may be upward, as previously referred to, or may be otherwise modified, the important thing being contact with suitable material and not just how it is obtained.

It is known to remove free carbonic acid from water by passing it through a bed of marble chips. This process, however, has no softening effect; on the contrary, it increases the hardness of the water and has, therefore, no bearing on the present invention which is only applicable in connection with processes for water softening.

I claim:

1. The process of reducing the hardness of water, comprising the steps of adding a reagent for precipitating the hardening ingredients present, then bringing the water into contact with a substance which promotes the precipitation and settling and then removing the water from contact with the said substance before the main part of the precipitate has been deposited.

2. A process as described in claim 1, in which the hardening ingredients, or part of them, are precipitated as carbonates and the contact substance is marble, limestone, or other chemically similar insoluble carbonates in the form of grains or chips.

3. An apparatus for water softening, comprising means for measuring and adding to the water agents for precipitating the hardening ingredients, a settling tank for settling the precipitate formed, and a bed of aggregated insoluble calcium carbonate for promoting the precipitation and settling of the hardening ingredients, interposed between the said means and the settling tank.

4. In a water softening process wherein the water is treated with a reagent to cause precipitation of hardening substances present in the water and thereafter clarified by sedimentation, the intermediate step which comprises causing the water to flow through a fixed bed of granular particles of an insoluble material consisting of the same chemical compounds as those which are precipitated from the water and of sufficient size to prevent said particles from being carried away by the water, the contact between the water and the bed being terminated before the main part of the precipitate has been deposited.

5. An apparatus for water softening, comprising means for measuring and adding a precipitating reagent to water, a settling tank for settling out precipitates formed by said reagent, and a container charged with granules containing an insoluble material consisting of the same chemical compounds as those which are precipitated from the water, said container being interposed between said reagent measuring and adding means and the settling tank.

AAGE THORKIL KROGH-LUND.